UNITED STATES PATENT OFFICE.

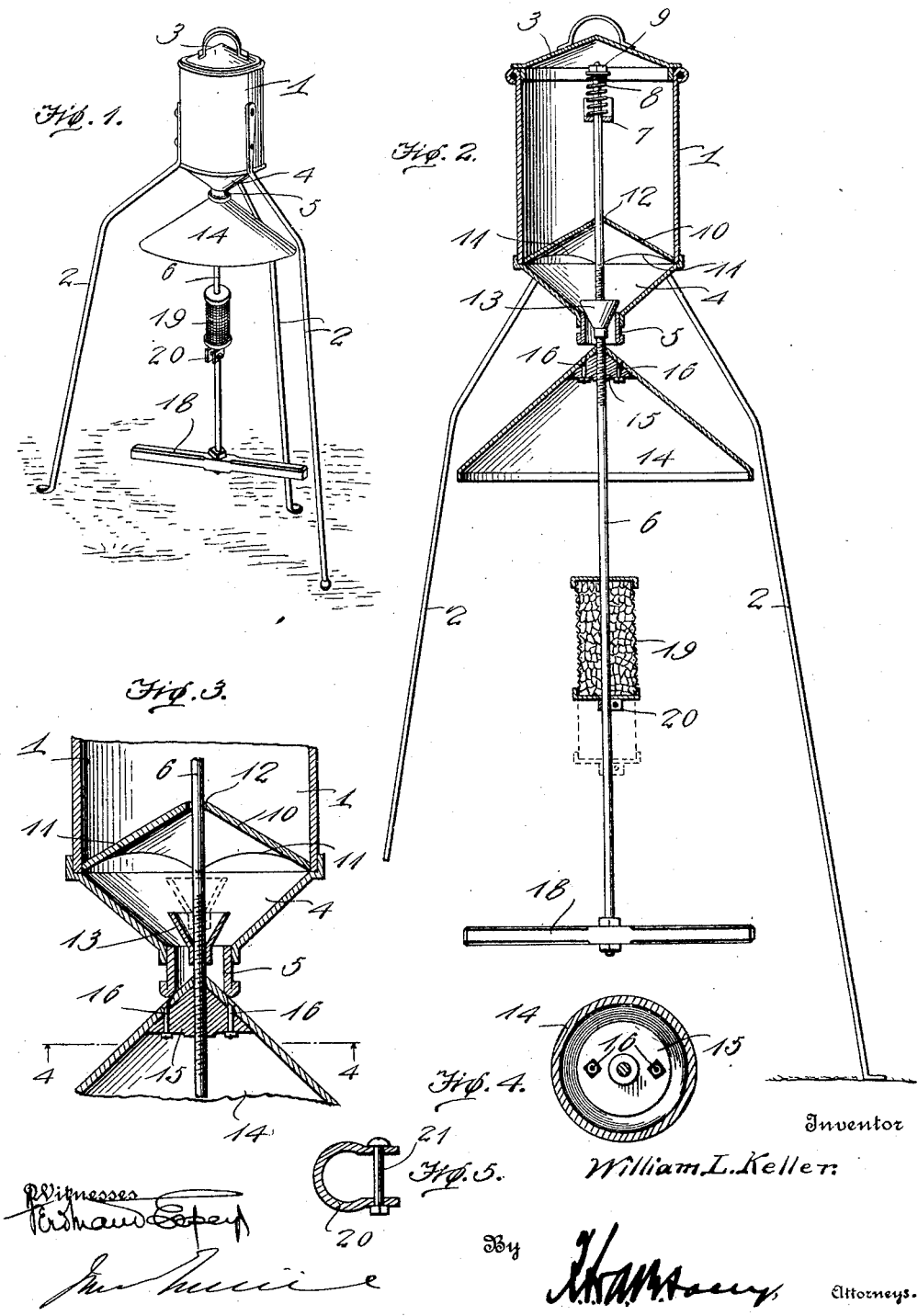

WILLIAM L. KELLER, OF KEARNEY, NEBRASKA.

CHICKEN-FEEDER.

1,112,068.  Specification of Letters Patent.  Patented Sept. 29, 1914.

Application filed December 30, 1912. Serial No. 739,388.

*To all whom it may concern:*

Be it known that I, WILLIAM L. KELLER, citizen of the United States, residing at Kearney, in the county of Buffalo and State of Nebraska, have invented certain new and useful Improvements in Chicken-Feeders, of which the following is a specification.

This invention relates to means for feeding poultry, and has special reference to apparatus in which the discharge of feed from a hopper is controlled by the feeding chickens.

The invention is illustrated in the accompanying drawings and consists in certain novel features which will be hereinafter first fully described and then more particularly pointed out in the claims following the description.

In the drawings: Figure 1 is a perspective view of an apparatus embodying my present improvements; Fig. 2 is an enlarged vertical section of the same; Fig. 3 is an enlarged detail vertical section of the lower end of the hopper and the parts coöperating therewith; Fig. 4 is a detail section on the line 4—4 of Fig. 3; Fig. 5 is a detail section through the support for the bait box.

In carrying out my invention, I employ a hopper 1 which may be of any desired shape and is preferably cylindrical and formed of sheet metal. The hopper may be supported in any convenient manner and is illustrated as being equipped with downwardly diverging legs 2 which may rest upon the ground or may be secured to a suitable platform, as will be readily understood. The hopper is also equipped with a cover or lid 3 adapted to fit snugly in the open top of the same so that, after the hopper has been filled, the grain or other feed will be protected against the attempts of birds or mice to steal the same and also protected against the weather. The lower end of the hopper is of a conical formation, as shown at 4, and provided with a central spout or outlet tube 5, and through the said spout or outlet tube an operating rod 6 axially extends. The upper end of the said rod 6 extends through and is guided by a cross bar 7 secured within the hopper, and a spring 8 is coiled around the upper end of the rod between the said cross bar and a nut 9 at the upper extremity of the rod, so that, by the expansion of the spring, the rod will be normally held upward. Near the bottom of the hopper is provided a baffle plate 10 of conical form having its edge provided with arcuate notches 11 whereby spaces are provided through which the grain may pass to the discharge spout or outlet tube 5, as will be readily understood. It will also be readily understood that an opening 12 is provided at the apex or center of this baffle plate so that the rod will be further guided by the said plate without unduly wearing thereon. Secured upon the operating rod within the hopper is a conical cut-off valve 13 which is adapted to engage the upper end of the spout or discharge tube 5 when the rod is depressed so that excessive flow of grain from the hopper will be prevented. It will also be readily understood that by adjusting the tension of the spring 8 and adjusting the cut-off valve along the operating rod the amount of grain permitted to escape at each operation may be regulated and the device will be adjusted to the weight and strength of the chickens within the inclosure or the number of fowls which are apt to be feeding at one time. Below the discharge tube 5 a deflector or spreader 14 is secured upon the operating rod, the connection consisting of a nut 15 threaded upon the operating rod, as shown most clearly in Fig. 3 and secured to the deflector or spreader by bolts 16. The nut is preferably conical so as to fit snugly within and reinforce the apex of the spreader and obtain a sufficiently extended engagement with the operating rod to be firmly supported and to hold the members of the rod together if the exigencies of manufacture should necessitate the making of the rod in sections. At the lower end of the operating rod is secured a cross bar or perch 18 upon which the fowls will light and roost in efforts to get at the corn displayed in a bait box 19 supported upon the operating rod at such a point above the perch as will be out of reach of the fowls and at the same time be low enough to attract their attention. The bait box may be of any convenient construction, but will preferably consist of a tube of wire netting secured rigidly to the operating rod and filled with corn or other feed so that the corn will be visible through the side of the box and attract the attention of the fowls.

The bait box will be preferably arranged around the rod with its lower end resting upon a clip 20 clamped around the rod by a bolt 21. This support may obviously be secured at any point along the rod so that the bait box may be adjusted to a height at which it will be out of reach of the largest fowl in the inclosure.

It is thought the operation of the device will be readily understood. When a chicken desires to feed, it will attempt to get at the corn displayed in the bait box and this attempt will cause it to fly up to and alight upon the perch 18. The weight of the chicken will cause the operating rod to at once drop until the cut-off valve 13 arrests the downward movement by engaging the upper end of the discharge spout 5 and the corn which may have been previously fed into the discharge spout will then pass therefrom onto the spreader 14 by which it will be scattered upon the ground around the perch. The fowl then, of course, will leave the perch to gather the feed thus scattered upon the ground and the spring 8 will then at once return the parts to normal position, further flow through the discharge tube being prevented by the spreader engaging the lower end thereof, as shown in Fig. 3, and a further supply of grain then passing into the discharge tube, as will be readily understood. It will be noted that the baffle plate 10 prevents the grain flowing in a mass to the discharge spout and directs the same toward the side of the hopper so that the grain passing the baffle plate will roll down the conical bottom of the hopper and, consequently, pass under or around the cut-off valve into the discharge spout. As the grain will be held within the discharge tube until the operating rod is depressed by a fowl alighting on the perch, loss of grain is prevented, inasmuch as only that quantity above the spreader and within the discharge tube can escape at each operation, the cut-off valve descending with the spreader so as to prevent flow into the discharge tube.

The fowls will be fully fed by the use of my device without any waste of grain, inasmuch as a very small quantity will be discharged at each operation of the device and the fowls will quickly learn that a supply of grain will be provided every time the rod is operated. Consequently, the fowls will continue flying onto the perch until their hunger has been satisfied and will then stop, so that no more grain will be discharged.

The device is thoroughly proof against the weather and against the efforts of birds, mice, or other marauders to abstract the grain.

What I claim is:—

1. A device for the purpose stated comprising a hopper, a yieldably supported operating rod extending into the hopper, a cut-off valve carried by said rod within the hopper, a bait box fitted around the rod below the hopper, and a perch carried by the rod below the bait box.

2. A device for the purpose stated comprising a hopper, a yieldably supported operating rod extending into the hopper, a cut-off valve carried by said rod within the hopper, a support secured upon the rod below the hopper, a bait box fitting around the rod and resting upon said support, and a perch carried by the rod below the bait box.

3. A device for the purpose stated comprising a hopper, a yieldably supported operating rod extending into the hopper, a cut-off valve carried by said rod within the hopper, a clip fitted around the rod below the hopper, a bolt inserted through the ends of the clip and clamping the same around said rod, a bait box fitted around the rod and resting on said clip, and a perch carried by the rod below the bait box.

In testimony whereof I affix my signature in presence of two witnesses.

WILLIAM L. KELLER. [L. S.]

Witnesses:
PAUL E. CAVENEE,
WILLARD F. BAILEY.

Copies of this patent may be obtained for five cents each, by addressing the "Commissioner of Patents, Washington, D. C."